(12) United States Patent
Hilgers et al.

(10) Patent No.: US 6,199,244 B1
(45) Date of Patent: Mar. 13, 2001

(54) VACUUM CLEANER WITH ELECTROSTATICALLY CHARGED COMPONENTS

(75) Inventors: Stefan Hilgers, Essen; Heinrich Iglseder, Rodenberg; Thomas Rodemann, Bochum; Frank Meyer, Hemer; Carsten Jacobs, Radevormwald; Gerd Zeeb, Wuppertal, all of (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 09/412,245

(22) Filed: Oct. 5, 1999

(30) Foreign Application Priority Data

Oct. 7, 1998 (DE) ................................. 198 46 103

(51) Int. Cl.$^7$ ................................. A47L 9/04; A47L 9/28
(52) U.S. Cl. ................................. 15/339; 15/1.51; 15/383; 15/415.1
(58) Field of Search .................... 15/1.51, 339, 383, 15/415.1

(56) References Cited

U.S. PATENT DOCUMENTS

| | | | | |
|---|---|---|---|---|
| 2,280,751 | * | 4/1942 | Davis | 15/1.51 |
| 3,355,755 | * | 12/1967 | Brooks | 15/1.51 |
| 3,395,042 | * | 7/1968 | Herbert, Jr. | 15/1.51 |
| 3,590,412 | * | 7/1971 | Gerbasi | 15/1.51 |
| 4,197,610 | * | 4/1980 | Schneider | 15/383 |
| 4,198,061 | * | 4/1980 | Dunn | 15/1.51 |
| 4,272,184 | * | 6/1981 | Rezanka | 15/256.52 |
| 4,715,086 | * | 12/1987 | Johanson et al. | 15/339 |
| 4,751,759 | * | 6/1988 | Zoell | 15/1.51 |
| 4,941,230 | * | 7/1990 | Lamore | 15/383 |
| 5,920,954 | * | 7/1999 | Sepponen | 15/339 |

FOREIGN PATENT DOCUMENTS

| | | |
|---|---|---|
| 3143489 | 5/1983 | (DE) . |
| 3820931 | 12/1989 | (DE) . |
| 19644589 | 4/1998 | (DE) . |

OTHER PUBLICATIONS

Patent Abstracts of Japan vol. 1999, No. 02, Feb. 26, 1999, and JP 10 295594 A (Kuwatake H), Nov. 10, 1998.
Patent Abstracts of Japan vol. 015, No. 031 (C–0798), Jan. 24, 1991, and JP 02 268715 A (Brother IND Ltd.) Nov. 2, 1990.
Patent Abstracts of Japan vol. 1998 No. 14, Dec. 31, 1998, and JP 10 248769 A (Matsushita Electric IND) Sep. 22, 1998.

* cited by examiner

Primary Examiner—Robert J. Warden, Sr.
Assistant Examiner—Theresa T. Snider
(74) Attorney, Agent, or Firm—Martin A. Farber

(57) ABSTRACT

A vacuum cleaner for cleaning floors or carpets, having a suction mouth (6), a base plate (5), which encloses the suction mouth (6), and a suction line, electrostatic charging of parts of the vacuum cleaner being provided in order to assist the dust uptake. In order advantageously to provide the vacuum cleaner with the dust uptake being assisted by electrostatic charging, the base plate (5) is electrostatically charged, and the electrostatic charging is carried out by a separate generator (8) provided in the vacuum cleaner.

19 Claims, 7 Drawing Sheets

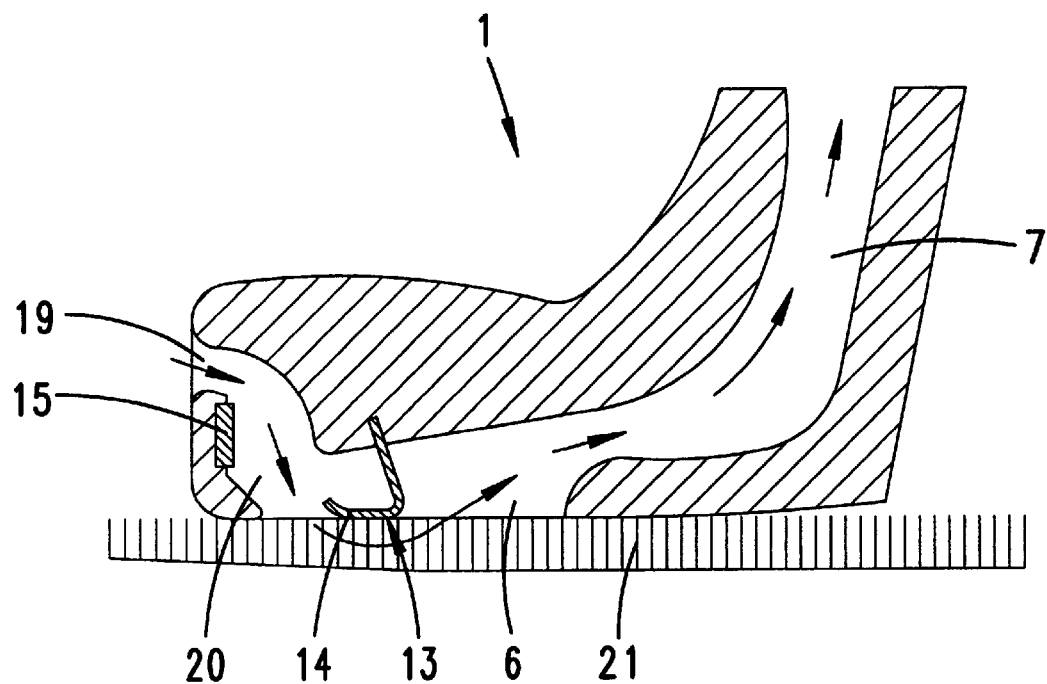

VACUUM CLEANER WITH ELECTROSTATICALLY CHARGED COMPONENTS

FIELD AND BACKGROUND OF THE INVENTION

The invention relates to a vacuum cleaner for cleaning floors or carpets, having a suction mouth, a base plate, which encloses the suction mouth, and a suction line, electrostatic charging of parts of the vacuum cleaner being provided in order to assist the dust intake.

In order to assist the cleaning performance of a vacuum cleaner in an effective manner, it is known to utilize electrostatic forces. By separating non-conductive/poorly conductive components of the vacuum cleaner from an object to be cleaned, the two components come to be electrostatically charged. The level and also the polarity are governed by the individual material pairings. Materials such as polyamide, wool or silk serve as donors and give up electrons easily. Separation results in a positive change on these materials. The substances released from these fibres or materials are negatively charged as a result of the electron uptake. An attraction force in the direction of the floor/carpet acts on the oppositely charged particles, the charge being reversed in the case of carpets made of alternative materials, e.g. polypropylene. However, the effects described are still present. If, then, an element, for example a nozzle, of a vacuum cleaner which is more strongly charged than a dust particle of the carpet, is brought into the vicinity of the carpet/dust system, then the attraction force of this element on the charged, floating particle may be sufficiently great, as a result of which the particle is removed. A basic consideration of the bonding forces between a particle and a surface show that essentially three different types of forces are active: the so-called van der Waals forces, the electrostatic forces (contact potential and reflective force) and the capillary forces. In terms of the charge of particles and the transportation thereof in an electric field, it is possible to distinguish between the basic mechanisms of friction, induction, corona discharge and dielectrophoresis.

The prior art utilizes, for example, the electrostatic bonding forces for the deposition of the particles located in an air volume-flow. For this purpose, the particles, which are taken up in the conventional manner by suction, are charged differently and separated by a filter system. Furthermore, a vacuum cleaner is known for example from DE-A1 196 44 589 which has a dust-attracting grid in the region of the suction mouth. The grid is connected to a high-voltage source and is connected up in the manner of a precipitation electrode. The suction-airstream laden with dust particles can flow through the dust-attracting grid.

In relation to the above-described prior-art, a technical problem of the invention is seen in advantageously developing a vacuum cleaner of the type in question in terms of the dust uptake being assisted by electrostatic charging.

SUMMARY OF THE INVENTION

This problem is solved first and foremost by the fact that the base plate is electrostatically charged, and that the electrostatic charging is carried out by means of a separate generator provided in the vacuum cleaner, it being possible, furthermore, for the electrostatic charge of the base plate to be both positive and also negative. Use is preferably made here of a base plate of metal material which is arranged in an insulated manner in relation to the subassemblies enclosing said base plate. Thus, a desired high voltage is produced by an external generator and applied directly to the base plate. The order of magnitude of the charges which are to be produced depends primarily here on the type of dust and floor covering/carpet, voltages, measured against earth potential, of between 1 and 20 kV being utilized. Consequently, increased dust uptake is achieved simply by applying an external voltage of preferably +5 kV to the base plate on different carpets. This increase in the dust uptake can be explained by a charge separation between particle and carpet fibre when the particle is released from the fibre. The particle obtains a negative charge here and is thus attracted by the positive base plate. Tests have shown that this effect can also be demonstrated without mechanical action, or by rotating brushes or the like. It may alternatively be provided that the base plate consists of a plastic material which is electrostatically charged by frictional contact with a floor covering, for example carpet. The sliding of the vacuum cleaner or of the vacuum-cleaner nozzle or the like on the floor covering as the floor covering is being cleaned results, by way of the friction movement, in the contact being intensified, which, by way of the resulting triboelectricity, brings about the opposite electric charging of the bodies being rubbed against one another, in this case the base plate and floor covering. The dust particles in the carpetting or the like are also released from the fibres by this electrostatic charge.

The invention also relates to a vacuum cleaner according to the introductory mentioned features, the vacuum cleaner also having a brush provided with bristles in order to act on the floor covering. In order to achieve improved dust uptake in this case, it is proposed that, as far as the material is concerned, the bristles be selected to be far apart in the triboelectric series. It is thus possible, in the case of vacuum cleaners with electrically driven cleaning brushes, by way of the specific selection of the bristle materials, to utilize the frictional contact between brush or bristles and carpet fibre as a charge source. The critical factor is for the respective material pairings to be as far apart as possible as far as the triboelectric series is concerned, with the result that an electrostatic charge is achieved by the frictional movement brought about by the rotating brushes. It is thus provided, for example, that the bristles consist of polypropylene for wool carpets or polyamide carpets. Furthermore, it is also conceivable to utilize natural bristles for placement on the brush, triboelectric effects likewise coming to the fore with pure natural-hair mixtures. In a development of the subject matter of the invention, it is provided that the base plate and the material of the suction line are selected in terms of the triboelectric series.

It has been established that, in order to influence the dust uptake positively, a potential, measured against earth, of less than 20 kV should be applied to the base plate. This voltage value is in an order of magnitude which can be applied, for example, by a separate generator in the vacuum-cleaner housing. Furthermore, in the case of a vacuum cleaner with a brush acting on the floor covering, said brush makes a considerable contribution to charge transfer. The usually neutral $SiO_2$ particles are released from the fibre/dust-particle bond by the volume flow and the mechanical work of the brushes. This results in a positive charge for the fibre and a negative charge on the dust particle. On account of the large-surface-area contact with the carpet, the base plate is likewise positively charged. Assuming that the plate is more positively charged than the individual carpet fibres, the $SiO_2$ particle will tend to move towards the plate and thus be removed from the carpet.

The invention also relates to a vacuum cleaner wherein, in order to influence the dust uptake positively, the brush can be subjected alternately to an electric potential for providing an electric charge and discharge, or can be grounded. This configuration according to the invention can be used alternatively to, or in combination with, the abovedescribed measures for increasing the dust uptake. Further charging and transporting operations are utilized in this case, for example charging by induction, which can be used in a controlled and reproducible manner. By the additional use of electrostatic effects, there is achieved a significant increase in the dust uptake for different carpets, the carpetting not being exposed to any increased mechanical loading and there being thus no increase in the pushing force. It is thus possible to establish increased dust uptake as a result of the controlled and reproducible, alternating action to which the brush is subjected. The electrostatic charging takes place in this case preferably directly in the floor region which is to be cleaned, and can thus be applied specifically.

The configuration preferred here is one in which the base plate and the bristles consist of an electrically conductive material. It is further preferred for the bristles to be arranged in bristle rows, and for it to be possible for the bristle rows, independently of one another, to be subjected to an electric potential, or to be grounded. The bristle rows are thus combined, for example, in sections of from 2 to 5 clusters of bristles which can be charged or discharged independently of one another. The charging takes place here preferably by way of a voltage source, for example by way of a generator integrated in the vacuum-cleaner housing. It has proven particularly advantageous here for sliding contacts to be provided on the brush for the electric powering of the brush. For contact-connection of the voltage source to the brushes, it is further provided for the sliding contacts to cooperate with a commutator. For specific application of the electrostatic charge produced, it is proposed that a bristle or a bristle row be charged in an angle-of-rotation region of the brush which corresponds to the contact of the brush on the carpet. The charging of a section of the bristle row thus is effected precisely at the moment at which the bristles engage in the carpet. The charging of the particles is effected essentially by direct contact with the bristles. Furthermore, it is also possible for ionization effects to occur here, if the voltage applied is high enough to cause corona discharge at the bristle tip. The base plate is grounded, with the result that there is an attraction force between the charged particle and the base plate. The lifting of the particle from the carpet is thereby promoted. As soon as the particle comes into contact with the base plate, it is discharged. That section of the bristle row which moves into the interior of the vacuum cleaner or of the vacuum-cleaner nozzle is likewise discharged, for example, at the base plate. Accordingly, at this time, there are no longer any attraction forces between particle and bristle or base plate, with the result that the particles can be conveyed away by the suction volume-flow without hindrance. The basic idea of this mechanism corresponds to the charging or the transportation of the particle by induction.

The invention also relates to a vacuum cleaner according to the introductory-mentioned features It is known to utilize active and passive ionization effects in order to apply electrostatic charges to surfaces, or to remove them therefrom, e.g. in the case of the production of foil and in the packaging industry. Of particular interest here is the active ionization (corona discharge), in the case of which a tip which is under high voltage generates positive and/or negative charges (ions) which are applied by the action of an electric field to the surface which is to be charged or discharged. On the basis of these methods, it is proposed according to the invention, in order to achieve improved dust uptake, that the suction mouth and the base plate consist of an insulating plastics material, that upstream of the suction mouth, as seen in the flow direction, a metal part, projecting into the air duct, be provided for corona discharge, and that a counter-electrode be provided in the suction line. The entire nozzle region of the vacuum cleaner, including the base thereof, consists of insulating plastics material. The air is sucked in, for example, at the front, there being provided, in the region of the sucked-in air stream, a grounded metal part which projects into the air duct and has an ionization tip formed on it. Provided in the interior of the suction line, protected against contact, is a counter-electrode which is formed, for example, as a metal strip or collector surface of conductive plastics material and to which an electric voltage is applied. With a sufficiently high voltage, corona discharge comes about in the region of the air-intake-side metal part. This results in an non-homogeneous electric field with a high field strength in the region of the metal part or of the ionization tips formed here. There is consequently established a so-called corona flow between the two electrodes. The positive and negative ions produced by the corona discharge can attach themselves both to conductive and to non-conductive particles. The ion cloud released is carried along by the air stream flowing through the suction line. The ions attach themselves to particles which experience an additional inwardly-directed force in the electric field between metal part and counter-electrode. The metal part, located in the intake region, may be provided in the form of a plurality of inwardly curved metal hooks aligned parallel to one another, the abovementioned non-homogeneous electric field being produced at the tips of the hooks. Alternatively, it may also be provided for the metal part to be a metal roller. The latter may advantageously be a conventional roller for the vacuum cleaner or the suction nozzle, said metal roller, in addition to the original significance for enabling easier sliding of the nozzle over the carpet, being now also used for optimizing the dust uptake. In a further configuration, it is provided that the metal part is a rotatable disc. The formation of the electric field or the discharge operation can be controlled by different configurations of the roller or disc surface. It is thus proposed for the surface of the metal part to be polished. Alternatively, it is also possible to select a construction in which the surface of the metal part is rough. This roughness may be provided, for example, by point-like elevations being applied to said surface or being worked onto the surface. Furthermore, it is possible, if metal discs are used, for the edges to be of different shapes, thus for example provided with points or rounded. Furthermore, it is also possible for the number of such discs to be varied. In a preferred configuration, it is provided that the counter-electrode is subjected to a high voltage of from 5 to 15 kV or higher. This high voltage may be achieved, for example, in that a generator provided in the vacuum cleaner is driven by a drive belt for the brush. By this configuration, it is made possible for the functional principle of the van der Graaff generator to be integrated in the vacuum-cleaner housing. The drive belt provided is thus utilized as a belt generator.

It is generally the case that add-on parts or subassemblies which serve for the electrostatic charging have to be extremely well insulated against leakage in relation to the adjacent assemblies. The extremely good insulation can be achieved merely by suitable selection of the material (plastics). The surface resistance of, for example, polypropylene is, at $10^{10}$ ohms, four powers of ten smaller than that of ABS. In order to produce the electrostatic charges or fields, different mechanisms can be used separately or together in a carpet-brush/vacuum-cleaner system. Furthermore, further variants of ionization electrodes and different arrangements as far as the counter-electrode is concerned are also conceivable. It is thus conceivable, for example, to dispense with a counter-electrode. Furthermore, it is also possible for the ion cloud developed at the electrodes to be blown into the carpet with the aid of an air stream.

All the applications described may, in principle, also be operated with reversed polarity. It has proven favourable, for the dust uptake, to have a positive high voltage of from 5 to 15 kV in relation to an earthed electrode. Furthermore, an a.c. high voltage is also conceivable. In order to increase the dust uptake, use is made of known physical principles (induction, ionization), which have not been used up until now for increasing the dust uptake. Already realized functional principles are, in part, developed further for more effective dust uptake. These also include the triboelectric charge (friction) being supplemented by active charging by voltage sources and the charges being applied specifically to the particles in the carpet. For this purpose, existing elements of a suction nozzle of a vacuum cleaner (e.g. roller, drive belt, etc.) may assume more significance by being utilized in order to produce or to apply electrostatic charges. The advantage of the invention described above resides, in particular, in the increase in the dust uptake. This is achieved without the carpet being subjected to additional mechanical action and without the volume flow or the negative pressure being increased, which results in the fan power and pushing force remaining the same.

BRIEF DESCRIPTION OF THE DRAWING

The invention is explained in more detail hereinbelow with reference to the attached FIGURES of the drawing, which merely illustrate a number of exemplary embodiments and in which:

FIG. 8 shows a further embodiment in a cross section through the suction nozzle.

DETAILED DESCRIPTION OF THE PREFERRED EMBODIMENTS

Figure 1:
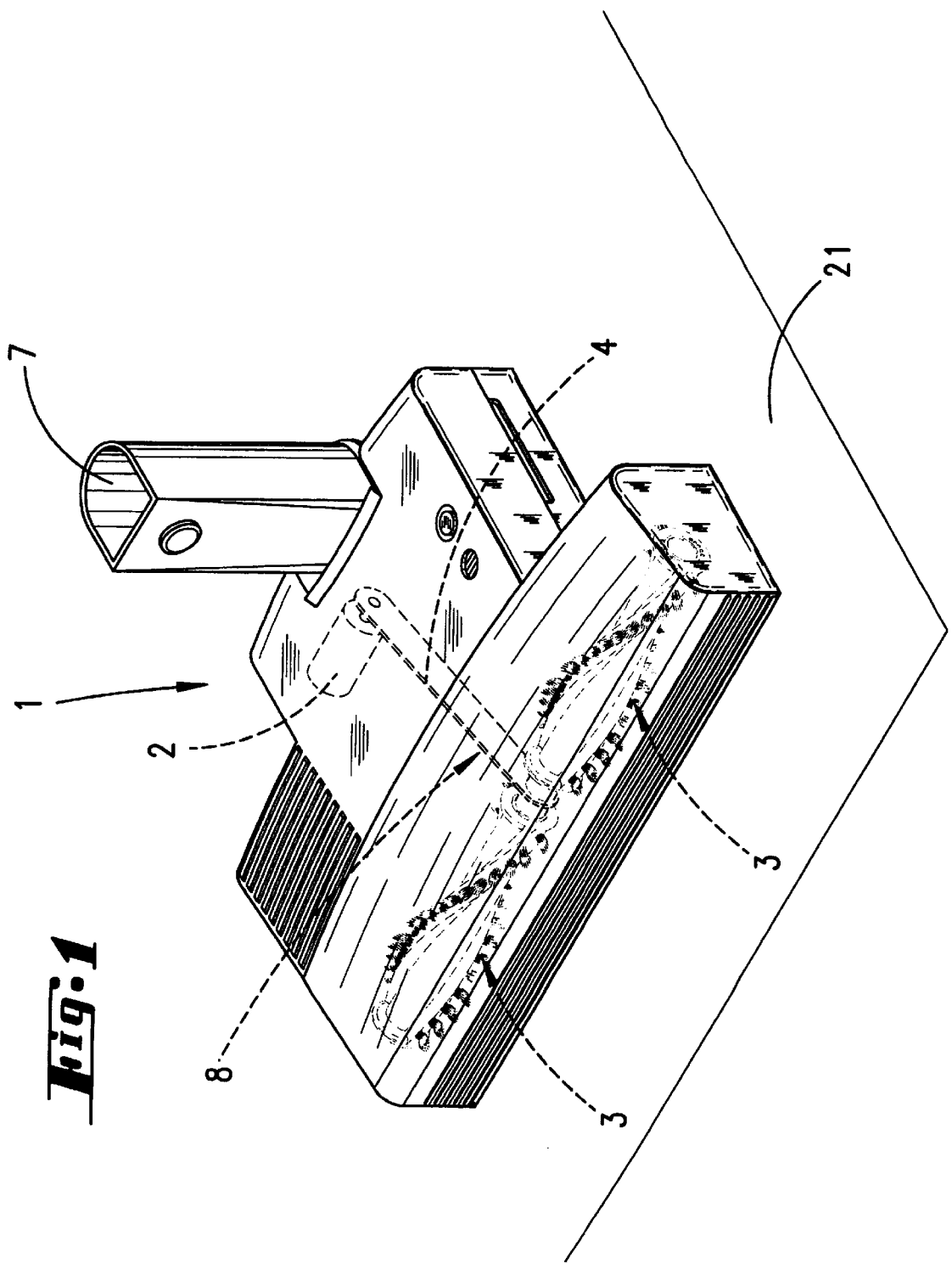
FIG. 1 shows a perspective illustration of a suction nozzle for a vacuum cleaner in a first embodiment.

Illustrated and described, first of all in relation to FIG. 1, is a suction nozzle 1 for a vacuum cleaner (not illustrated), the nozzle having an integral electric motor 2 for driving two brushes 3 arranged for acting on the floor covering 21. Drive of the brushes 3 is effected by way of a drive belt 4.

Figure 2:
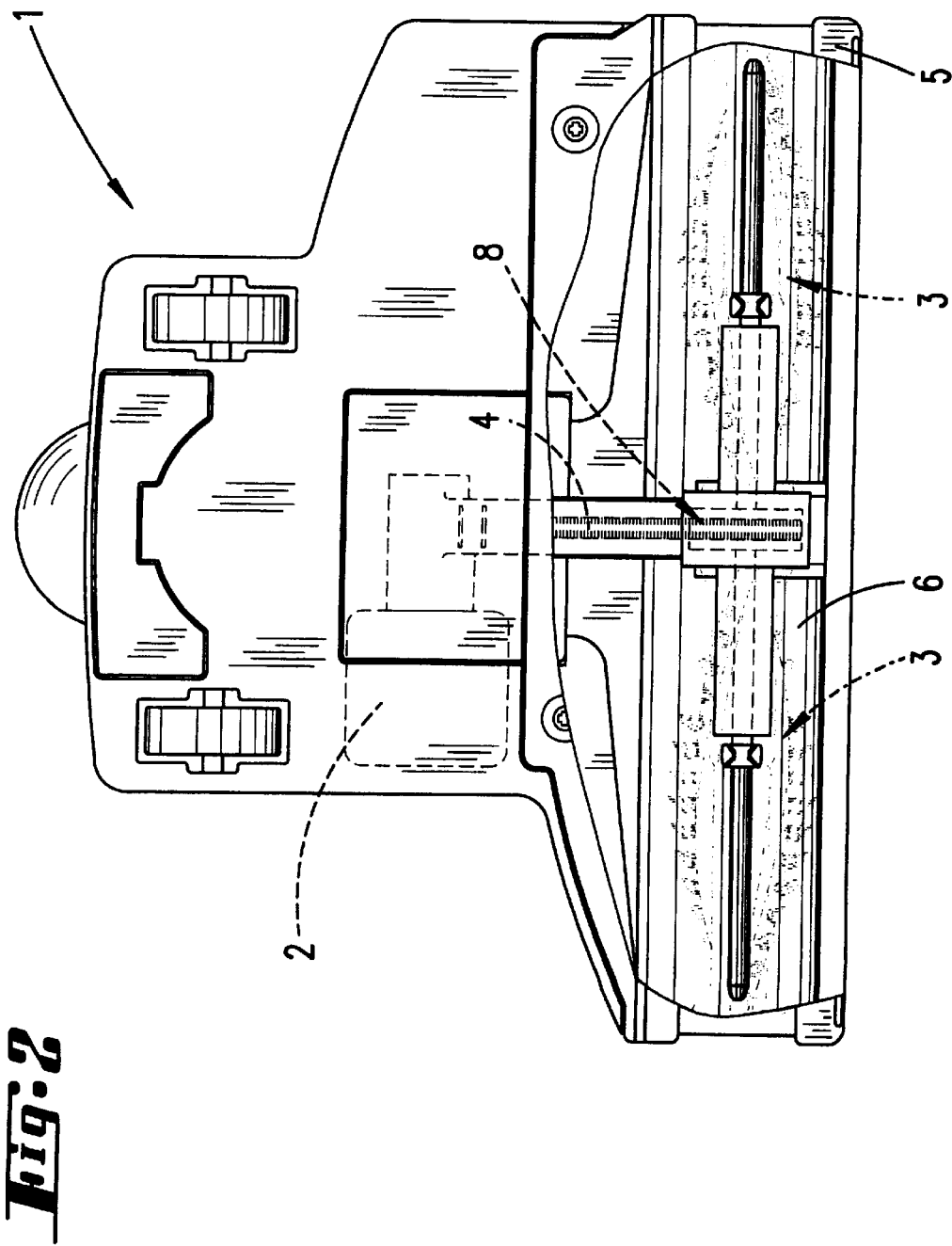
FIG. 2 shows a bottom view of the suction nozzle.
Figure 3:
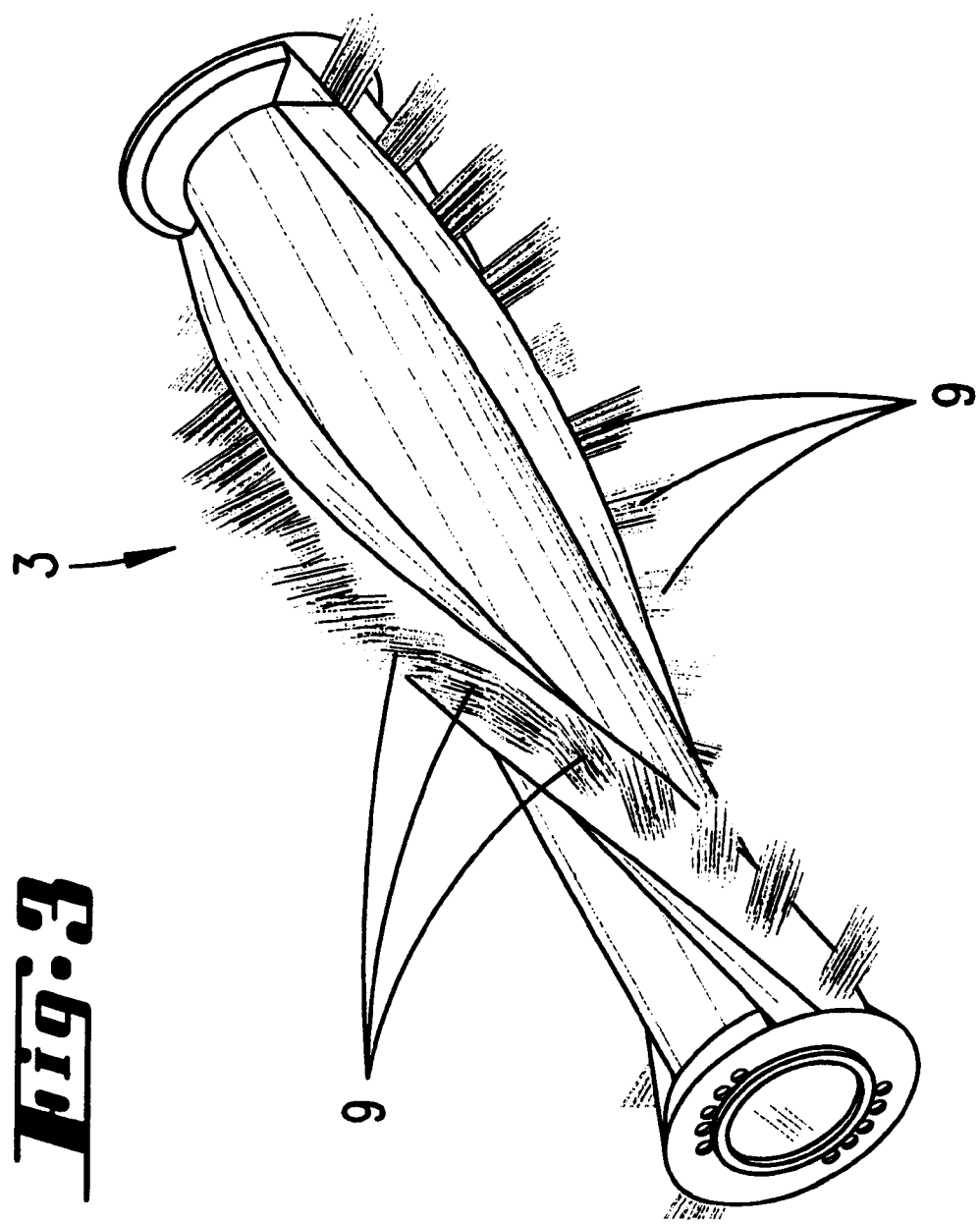
FIG. 3 shows a perspective detail illustration of a brush of the suction nozzle.

In the first embodiment, which is illustrated in FIGS. 1 to 3, an electrostatically charged base plate is provided first of all in order to increase the dust uptake. The base plate encloses, on the underside of the nozzle, the suction mouth 6 into which there opens out a suction line 7, which can be included in the vacuum cleaner from the flow point of view.

The base plate 5, which is illustrated in more detail in the bottom view of FIG. 2, may consist of a plastic material, said base plate being electrostatically charged by frictional contact with the floor covering, in particular carpetting. However, it is preferred for the base plate 5 to be actively electrostatically charged, for which purpose a separate generator 8 is provided in the vacuum cleaner or in the suction nozzle. Said generator is formed according to the invention by the drive belt 4, which is already present and is utilized as a belt generator or as a Van der Graaff generator.

Furthermore, static charging of the bristles 9 and of the brushes 3 is also provided in this exemplary embodiment. For this purpose, as far as the material is concerned, the bristles are selected to be far apart in the triboelectric series, thus for example to be of polypropylene for treating wool carpets or polyamide carpets. The friction contact between the brushes or the bristles and the carpet fibres is thus utilized as a charge source. It is also conceivable here for the base plate 5 and the material of the suction line 7 or suction mouth 6 to be selected in terms of the triboelectric series.

Figure 4:
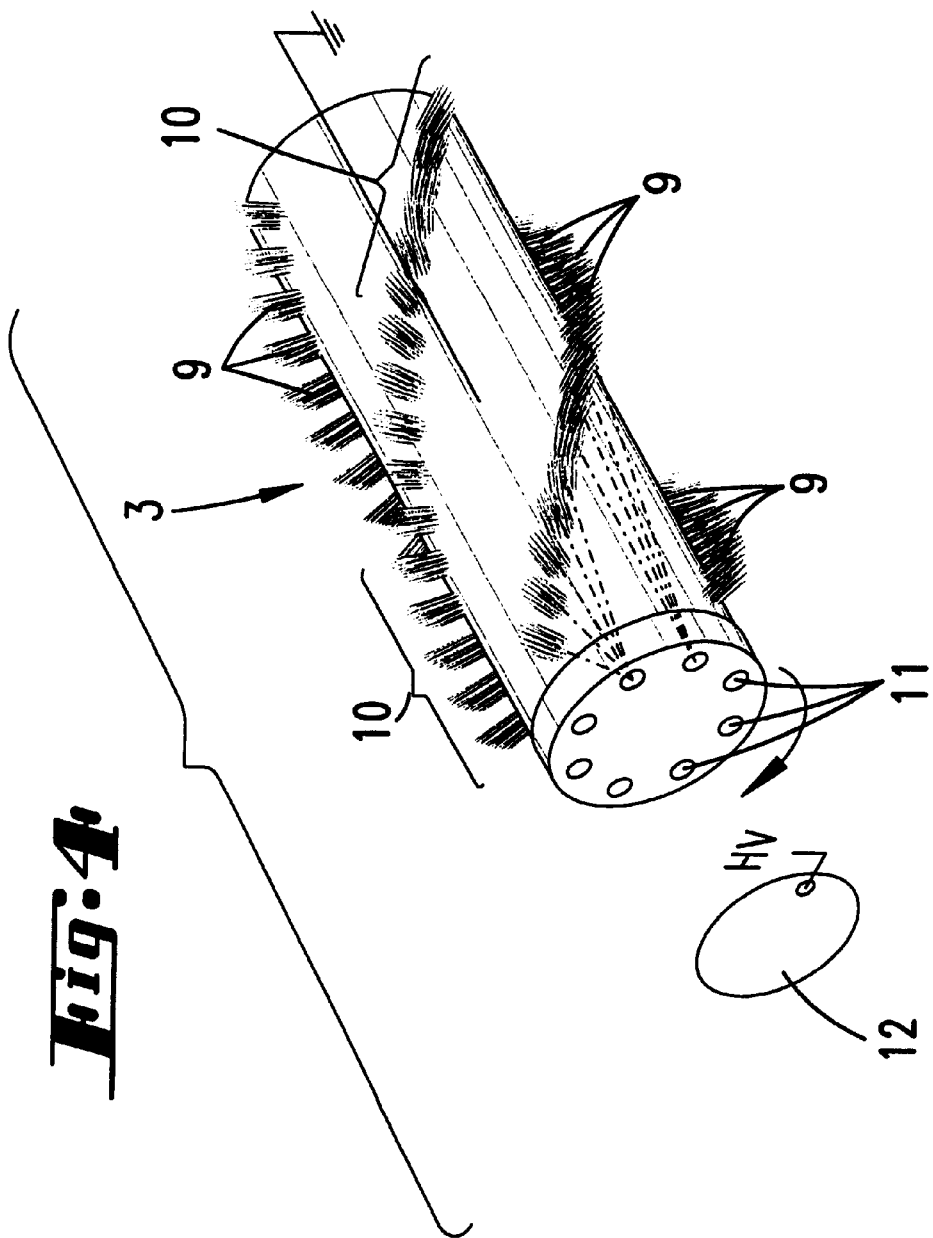
FIG. 4 shows a perspective illustration of a brush in a second embodiment.
Figure 5:
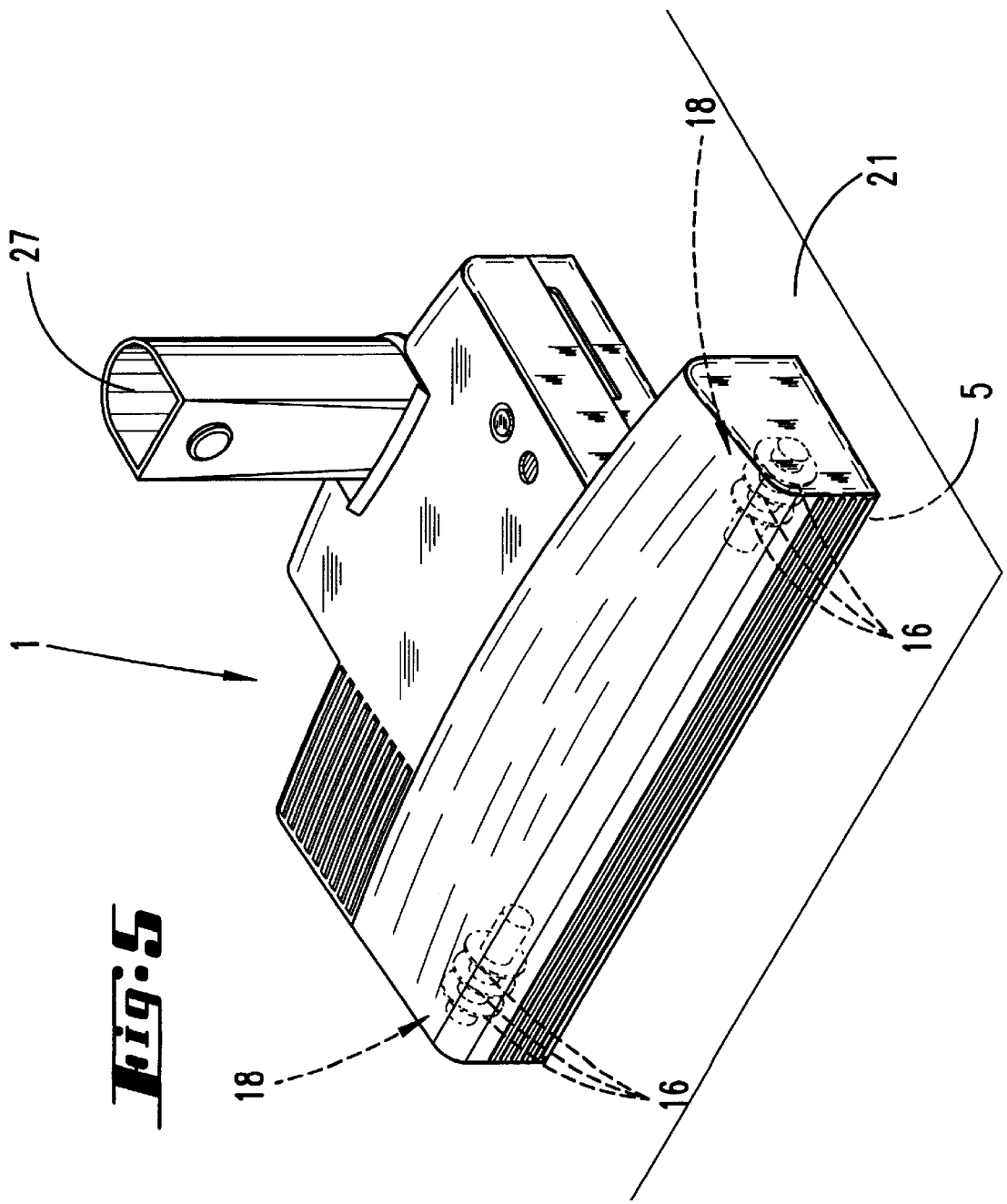
FIG. 5 shows the suction nozzle in perspective illustration, in relation to a third embodiment.
Figure 6:
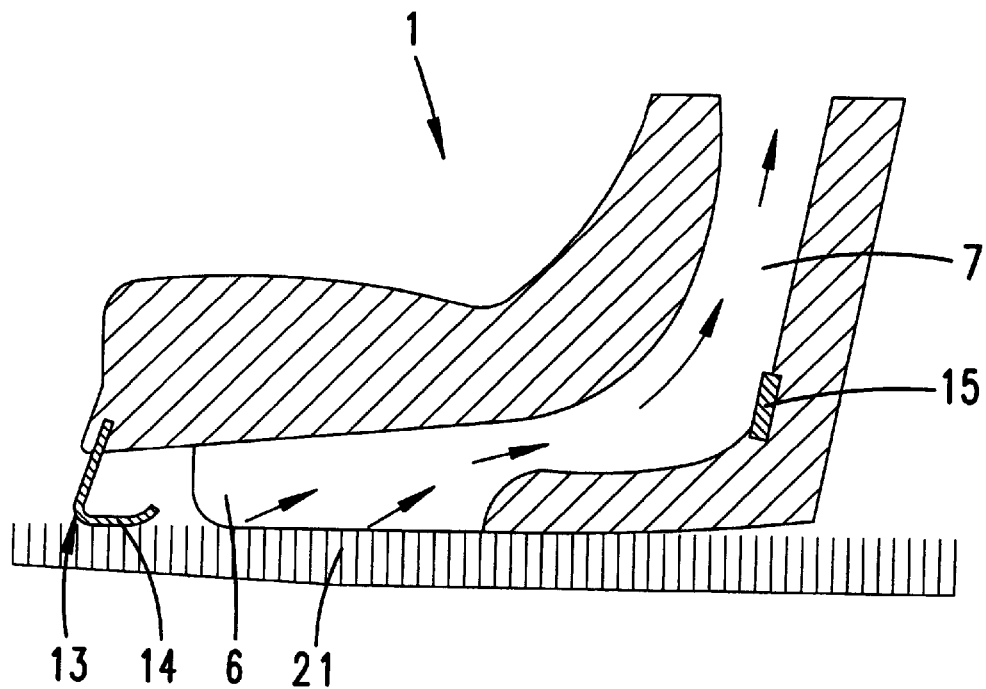
FIG. 6 shows a schematic cross section through the suction nozzle, in relation to a further embodiment.

A further alternative configuration for achieving electrostatic charging in order to assist the dust intake is described hereinbelow with reference to FIG. 4. For this purpose, the brush is actively electrostatically charged in order to treat the carpetting. In specific terms, this is achieved in that the brush 3 is subjected alternately to an electric potential for providing an electric charge and discharge or is earthed. For this purpose, the base plate 5 and the bristles 9 of the brush 3 are produced from an electrically conductive material. According to the invention, two to five clusters of bristles are electrically combined to give bristle rows 10, which individual bristle rows 10 can be charged or discharged independently of one another. The charging takes place by means of a voltage source (generator 8), which may also be formed in this case by the drive belt 4 in the form of a belt generator. This voltage source is contact-connected to the bristles 9 or the bristle rows 10 with the aid of sliding contacts 11 provided on the brush 3 and which slide on a commutator 12. The charging of a section of the bristle row 10 takes place precisely at the moment at which the bristles 9 engage in the carpet which is to be cleaned. The charging of the particles (dust particles) takes place essentially by direct contact with the bristles 9. In addition, it is also possible for ionization effects to occur, if the voltage applied is high enough to bring about corona discharge at the bristle tip.

The base plate 5 is grounded, as a result of which there is an attraction force between the charged particles and the base plate 5, which promotes lifting of the dust particle from the carpet. As soon as the particle comes into contact with the base plate 5, it is discharged. That section of the bristle row 10 which moves into the interior of the suction nozzle 1 is likewise discharged at the base plate 5. Accordingly, thereafter, there are no longer any attraction forces between particle and bristles 9 or base plate 5, so that the particles can be conveyed away into the interior by the suction volume-flow without hindrance.

A further alternative configuration is illustrated in FIGS. 5 to 8. In this case, the ionization principle is applied. The suction nozzle 1 consists entirely of an insulating plastics material, as do also the suction mouth 6 and the base plate 5. Upstream of the suction mouth, as seen in the flow direction, a metal part 13, projecting into the air duct, is provided for corona discharge. This metal part 13 is formed by inwardly curved metal hooks 14 in the exemplary embodiment illustrated in FIG. 6, As seen transversely to the direction of displacement of the suction nozzle 1, said metal hooks are spaced apart from one another uniformly over the entire suction-mouth width. The metal part 13 and the metal hooks 14 are grounded in the exemplary embodiment shown. The tips of the metal hooks 14 are directed towards a counter-electrode 15 which is provided in the interior of the suction line 7, protected against contact, and is in the form of a metal strip. An electric voltage, preferably a positive high voltage of from 5 to 15 kV or higher, is applied to said counter-electrode.

With sufficiently high voltage, there is corona discharge at the tips of the metal hooks 14. The ion charge released as a result is carried along by the air stream. The ions attach themselves to particles which are thus subjected to an additional inwardly directed force in the electric field between the tips and counter-electrode 15.

Figure 7:
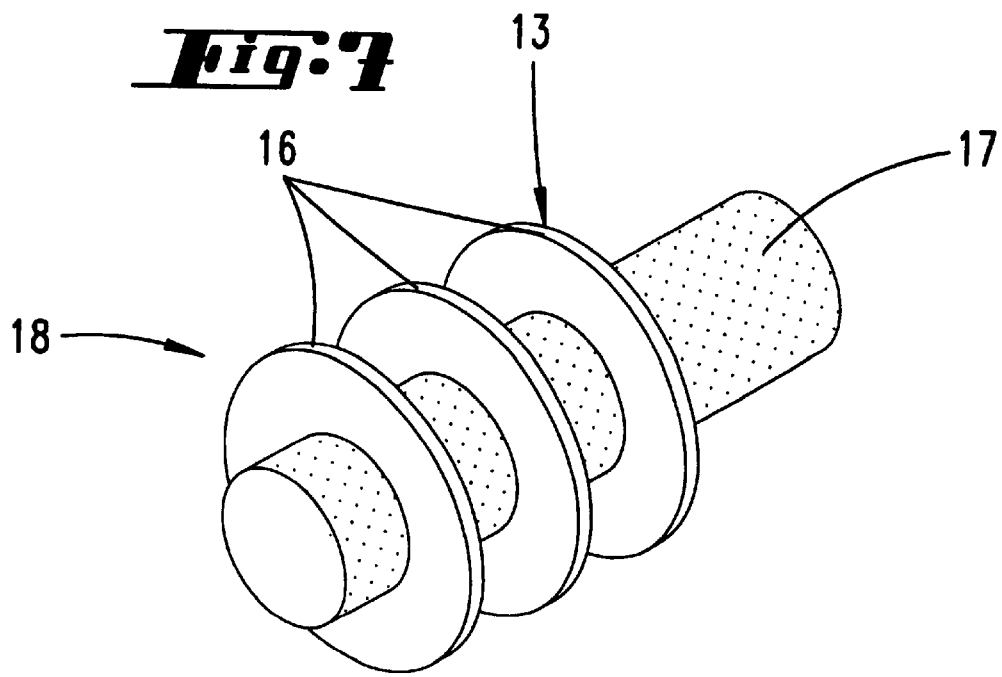
FIG. 7 shows a perspective illustration of a roller, made up of a plurality of discs, for the suction nozzle according to a further embodiment.

As an alternative to the metal hooks 14, it is also possible to utilize rotatable discs 16 as ionization electrodes. An example of this is illustrated in FIG. 7. In this case, there are provided three discs 16 which are spaced apart uniformly from one another, are of substantially the same shape and are mounted on a shaft 17. Shaft 17 and discs 16 together form a metal roller 18 for the suction nozzle 1. In the perspective illustration of FIG. 5, these are illustrated schematically in their arrangement in a suction nozzle 1.

The formation of the electric field or the discharge operation may be controlled by different configurations of the roller and/or shaft surface, it is thus possible, as is illustrated diagrammatically in FIG. 7, for the surface to be roughened. Alternatively, it is also possible to use a polished surface. Furthermore, in order to control the electric field or the discharge operation, it is also possible for the running edge of each disc 16 to be of different shape, for example rounded or provided with points. Moreover, it is also possible for the number of discs 16 to be varied. In addition to the original significance of allowing easier sliding of the nozzle 1 over the carpet, the rollers 18 are thus also used for optimizing the dust uptake.

A further exemplary embodiment is illustrated in the sectional illustration according to FIG. 8. Here too, a metal part 13 which is provided in she form of a plurality of metal hooks 14 and constitutes an ionization electrode is provided in the intake region in the vicinity of the floor in order to achieve an ion cloud. In contrast to the abovedescribed exemplary embodiment according to FIG. 6, the intake nozzle 1 has an intake opening 19 at the front. Extending from this is an intake channel 20, which opens out at the other end in the suction mouth 6.

Provided in the intake channel 20, protected against contact, is the counter-electrode 15, opposite which, in the transition region from intake channel 20 to the suction line 7, the tips of the metal part 13 are located.

According to the invention, the ion cloud developed in the case of this construction is blown into the carpet with the aid of the air stream in the intake channel 20, in order further to increase the dust uptake by electrostatic charging.

What is claimed is:

1. Vacuum cleaner for cleaning floors or carpets, comprising:
    an electrostatic charging generator, a base plate defining a suction mouth, and a suction line connecting with the mouth,
    wherein the base plate is electrically conductive for reception of an electrostatic charge from the charging generator in order to assist dust uptake.

2. Vacuum cleaner according to claim 1, further comprising a brush adjacent to the base plate and being provided with bristles for acting on a floor covering, wherein with respect to a material of the floor covering, the bristles are selected to be far apart in a triboelectric series from the material of the floor covering.

3. Vacuum cleaner according to claim 2, wherein, for adapting the vacuum cleaner for use on wool carpets or polyamide carpets, the bristles are made of polypropylene to attain a desired triboelectric relationship between the bristles and the carpets.

4. Vacuum cleaner according to claim 2, wherein the base plate and a material in the suction line are selected with reference to the triboelectric series.

5. Vacuum cleaner according to claim 2, further comprising a connection of the brush to the generator wherein the connection enables the brush to receive an electric potential for providing an electric charge, or alternatively to be grounded.

6. Vacuum cleaner according to claim 5, wherein the base plate is metallic and the bristles are made of an electrically conductive material.

7. Vacuum cleaner according to claim 5, wherein the bristles are arranged in bristle rows, and the bristle rows, independently of one another, can be subjected to an electric potential or can be grounded.

8. Vacuum cleaner according to claim 5, further comprising contacts provided on the brush for connection to the generator to attain electric charging of the brush.

9. Vacuum cleaner according to claim 8, further comprising a commutator positioned adjacent the brush for receiving the contacts, and wherein the contacts slide along the commutator during rotation of the brush.

10. Vacuum cleaner according to claim 5, wherein a bristle or a bristle row is charged in an angle-of-rotation region of the brush which corresponds to contact of the brush on the carpet.

11. Vacuum cleaner according to claim 1, wherein the suction mouth and the base plate are made of an insulating plastic material, and upstream of the suction mouth, in flow direction, a metal part, projecting into an air duct, is provided for corona discharge, and a counter-electrode is provided in the suction line.

12. Vacuum cleaner according to claim 11, wherein the metal part is a metal roller.

13. Vacuum cleaner according to claim 11, wherein the metal part is a rotatable disc.

14. Vacuum cleaner according to claim 11, wherein the surface of the metal part is polished.

15. Vacuum cleaner according to claim 11, wherein the surface of the metal part is rough.

16. Vacuum cleaner according to claim 11, wherein the counter-electrode is constructed to withstand a high voltage of from 5 to 15 kV or higher.

17. Vacuum cleaner according to claim 1, further comprising a brush and a drive belt serving concurrently to impart motion to the brush and to drive the generator.

18. Vacuum cleaner for cleaning floors or carpets, comprising:
    an electrostatic charging generator, a base plate defining a suction mouth adapted to connect with a suction line, a brush located in a suction path of the mouth, and a drive unit;
    wherein at least one of the brush and the base plate is electrically conductive for reception of an electrostatic charge from the charging generator in order to assist dust uptake, and the drive unit imparts motion to the brush while driving the generator.

19. Vacuum cleaner for cleaning floors or carpets, comprising:
    an electrostatic charging generator, a base plate defining a suction mouth adapted to connect with a suction line, a brush located in a suction path of the mouth, and an electrical circuit;
    wherein the brush is electrically connected by the circuit to the generator for reception of an electrostatic charge from the charging generator in order to assist dust uptake, and the circuit provides alternatively for grounding or charging of the brush.

* * * * *